United States Patent
Fidale et al.

(10) Patent No.: US 10,934,398 B2
(45) Date of Patent: Mar. 2, 2021

(54) METHOD FOR OBTAINING A COLLOIDAL DISPERSION, COLLOIDAL DISPERSION AND USE THEREOF

(71) Applicant: Companhia Nitro Química Brasileira, São Paulo (BR)

(72) Inventors: Ludmila De Carvalho Fidale, São Paulo (BR); Reginaldo Faichel Da Silva, São Paulo (BR)

(73) Assignee: Companhia Nitro Quimica Brasileira, Sao Paulo (BR)

( * ) Notice: Subject to any disclaimer, the term of this patent is extended or adjusted under 35 U.S.C. 154(b) by 262 days.

(21) Appl. No.: 16/067,329

(22) PCT Filed: Dec. 29, 2016

(86) PCT No.: PCT/BR2016/050365
§ 371 (c)(1),
(2) Date: Nov. 6, 2018

(87) PCT Pub. No.: WO2017/113000
PCT Pub. Date: Jul. 6, 2017

(65) Prior Publication Data
US 2019/0062509 A1    Feb. 28, 2019

(30) Foreign Application Priority Data
Dec. 29, 2015    (BR) .................... BR102015032910-5

(51) Int. Cl.
| C08J 3/07 | (2006.01) |
| C09D 101/18 | (2006.01) |
| C09D 133/26 | (2006.01) |
| C09D 5/02 | (2006.01) |
| C09D 11/023 | (2014.01) |
| C09D 11/14 | (2006.01) |
| C09D 11/107 | (2014.01) |
| C08F 220/18 | (2006.01) |
| C09D 11/102 | (2014.01) |
| C08F 120/18 | (2006.01) |
| C09D 133/08 | (2006.01) |
| C08L 1/18 | (2006.01) |
| D06M 15/263 | (2006.01) |
| D06M 15/07 | (2006.01) |

(52) U.S. Cl.
CPC .............. *C08J 3/07* (2013.01); *C08F 120/18* (2013.01); *C08F 220/18* (2013.01); *C08L 1/18* (2013.01); *C09D 5/022* (2013.01); *C09D 11/023* (2013.01); *C09D 11/102* (2013.01); *C09D 11/107* (2013.01); *C09D 11/14* (2013.01); *C09D 101/18* (2013.01); *C09D 133/08* (2013.01); *C09D 133/26* (2013.01); *C08J 2301/18* (2013.01); *C08J 2333/08* (2013.01); *C08J 2401/18* (2013.01); *C08J 2433/08* (2013.01); *D06M 15/07* (2013.01); *D06M 15/263* (2013.01)

(58) Field of Classification Search
CPC .... C09D 101/18; C09D 133/26; C09D 5/022; C09D 11/023; C09D 11/14; C09D 11/107; C08J 3/07; C08J 2433/08; C08J 2301/18; C08J 2333/08; C08J 2401/18
See application file for complete search history.

(56) References Cited

U.S. PATENT DOCUMENTS

2005/0250881 A1    11/2005  Gref et al.
2008/0193520 A1*   8/2008   Moschwitzer .......... A61P 37/06
                                                    424/456

FOREIGN PATENT DOCUMENTS

| BR | 9407333 | 6/1996 |
| CN | 101364039 | 2/2009 |
| CN | 10-2816527 A * | 12/2012 |
| CN | 102816527 | 12/2012 |
| CN | 103774481 | 5/2014 |
| CN | 104046183 | 9/2014 |
| CN | 104358026 | 2/2015 |
| CN | 104388035 | 3/2015 |
| CN | 104861847 | 8/2015 |
| EP | 0051286 | 5/1982 |
| KR | 20110035454 | 4/2011 |
| KR | 20120025320 | 3/2012 |
| WO | WO 2005/074395 | 8/2005 |

OTHER PUBLICATIONS

International Search Report and Written Opinion for International Application No. PCT/BR2016/050365 dated Mar. 27, 2017, 16 pages.

\* cited by examiner

*Primary Examiner* — Robert D Harlan
(74) *Attorney, Agent, or Firm* — Alston & Bird LLP

(57) ABSTRACT

The present invention relates to an improved method for producing a colloidal nitrocellulose dispersion made compatible with a system of acrylic monomers polymerized with surfactants in a water-based system under pressure. The self-emulsifiable system of the present invention is characterized by the latex formed by the nitrocellulose suspension in an aqueous medium, with nanometric particles and homogeneity and, consequently, a greater covering and smoothing power, high adherence, high gloss, greater chemical and mechanical resistance, rapid drying, less water retention when used in paints, varnish and sealant compositions for coatings in the fields of graphic printing, such as flexography and rotogravure, lamination, nail polish, metal-mechanics, decoration, glass, leather, plastics, wood surfaces, compounds and mortars, decorative wall paints, textiles, paper coatings and car paint repairs, inter alia. Besides providing high-performance properties, the product according to this invention is environmentally friendly.

17 Claims, 7 Drawing Sheets

(A)          (B)

METHOD FOR OBTAINING A COLLOIDAL DISPERSION, COLLOIDAL DISPERSION AND USE THEREOF

FIELD OF THE INVENTION

The present invention relates to an improved method for producing a colloidal nitrocellulose dispersion made compatible with a system of acrylic monomers polymerized with surfactants in a water-based system under pressure. The self-emulsifiable system of the present invention is characterized by the latex formed by the nitrocellulose suspension in an aqueous medium, with nanometric particles and homogeneity and, consequently greater smoothness and covering power, high adherence, high gloss, greater chemical and mechanical resistance, rapid drying, less water retention when used in inks, paints, varnishes and sealant compositions for coatings in the printing segments, such as flexography and rotogravure, lamination, nail polishes, metal-mechanics, decoration, glass, leather, plastics, wood surfaces, compounds and mortars, decorative wall paints, textiles, paper coatings and automotive paint repairs, among other applications. Besides providing high-performance properties, the product according to this invention is environmentally friendly.

BACKGROUND OF THE INVENTION

The paint and coatings industry is increasingly demanding in relation to environmental aspects of their processes and the performance of their products.

Nitrocellulose is an excellent film-forming agent that is widely used in coatings as it provides a homogeneous film. Nitrocellulose emulsions found at the state of the art are generally are obtained by processes that use organic solvents. Paints and varnishes produced from such emulsions thus present a Volatile Organic Content (VOC) that exceeds the desirable limits.

There are some documents at the state of the art that describe processes for obtaining a water-based nitrocellulose emulsion, but the characteristics of the resulting emulsions, such as particle size for example, do respond to coverage, adherence and homogeneity demands like the film resulting from the resin obtained through the process according to this invention.

In particular, there are documents at the state of the art that provide enlightening descriptions of emulsion particle microscopy, or even describe nano-particle size.

The development of a nano-colloidal system requires the identification of parameters proving particle structure formation and organization, in addition to ensuring the ongoing stability of the system once it is formed, as smaller particle size leads to better performance by the film in applications using the content resin.

Document EP0494607 describes a system for dissolving nitrocellulose in a water-soluble acrylic synthesis polymer. However, the colloidal dispersion particle size defined in the document is at a magnitude measured in microns.

The preparation process of a cellulose polymer emulsion described in document U.S. Pat. No. 4,011,388 addresses the dissolution of the said polymer in a water-based monomer, but using an organic co-solvent. The particle obtained through this process is also of a magnitude measured in microns. Furthermore, the monomers used in the process— vinyl monomers—are suitable for use in automotive paint repair applications (top coats).

Thus, although there are descriptions of processes for obtaining a water-based nitrocellulose emulsion, there is clearly a need to develop a process for obtaining nitrocellulose emulsion holds particles are measured in nanometers, in order to upgrade the characteristics of the end-product, namely: obtaining a more homogenous film that is more resistant to temperature and pressure, with high performance for the described applications and without using organic solvents. This ensures a final system that is environmentally more advantageous system (lower VOC content and also recalling that nitrocellulose is biodegradable), while maintaining emulsion stability.

SUMMARY OF THE INVENTION

The purpose of this invention is to provide water-based colloidal nitrocellulose nano-dispersion, to be used preferably for manufacturing inks, paints, varnishes and sealants for coatings in the printing segments, such as flexography and rotogravure, lamination, nail polishes, metal-mechanics, decorative items, glass, leather, plastic, wood surfaces, compounds and mortars, decorative wall paints, textiles, paper coatings and automotive paint repairs, among other applications.

One of the embodiments of the present invention defines a method for obtaining water-based colloidal nitrocellulose nano-dispersion.

A second embodiment of the invention relates to the water-based colloidal nitrocellulose nano-dispersion obtained from the said process and characterized in that it has a particle size ranging between approximately 100 nm and 200 nm, more preferably between 120 nm and 140 nm.

A third embodiment of the invention relates to the use of the water-based colloidal nitrocellulose nano-dispersion obtained by the said process in various applications, such as the composition of wood varnishes and sealants, paint formulations, inks, paints, varnishes and sealants for coatings in the printing segments, such as flexography and rotogravure, lamination, nail polishes, metal-mechanics, decorative items, glass, leather, plastic, wood surfaces, compounds and mortars, decorative wall paints, textiles, paper coatings and automotive paint repairs, among other applications, as well as a rheological agent for several formulations.

DETAILED DESCRIPTION OF THE INVENTION

The purpose of this invention is to provide a process for obtaining a colloidal nano-dispersion of a self-organized acrylic-water-nitrocellulose system based on its homogenization at the desired particle size through a defined pressure used in the said process.

The self-organization concept is defined in a manner whereby the homogenization and the behavior exhibited by the particles tend to become organized through a self-control system, at a smaller-scale size. The polymer structure has molecules that are chemically modified or completely solubilized and adjusted to the reaction conditions by the number of embodied functional groups allocated at the ends of its structure.

The molecular structure of the nitrocellulose polymer was created with a defined geometry to generate colloidal nano-dispersion, wherein the particle size ranges from approximately 100 nm to 200 nm, and also the said colloidal dispersion further comprises acrylic monomers, presenting a homogeneous structure, self-organized by applying pressure during the process used to obtain it.

The organization obtained for the colloidal nano-dispersion structure of the nitrocellulose with acrylic functional monomers in a water base is driven by molecular interactions that mimic each other between the hydrophilic and hydrophobic bases.

Self-organization is thus a process where the nitrocellulose, the main constituent of the water-based colloidal nano-dispersion structure, is dissolved in the acrylic functional monomers in micelles formed by the dispersion process and subsequent polymerization which results in the final colloidal nanostructure.

The self-organization of the said structure is thus defined by its formation process, i.e., by solubilizing the nitrocellulose in the dispersion of the acrylic functional monomers.

The mobility of the particles is measured by zeta potential, i.and, through the mobility of the particles by the magnitude of the electrostatic potential on the surface of the colloid.

This mobility is defined by the association of the nitration level with the polymerization. The greater the mobility, the better the interaction and activity between the nitrocellulose and the acrylic emulsion. Achieving this increased activity is a result of the application of pressure in the system, which allows its complete homogenization.

Figure 10:
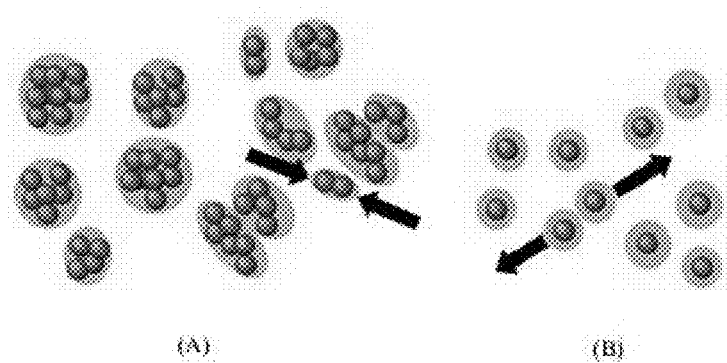
FIG. 10—presents a graph representation of particles in a colloidal emulsion.
Figure 11:
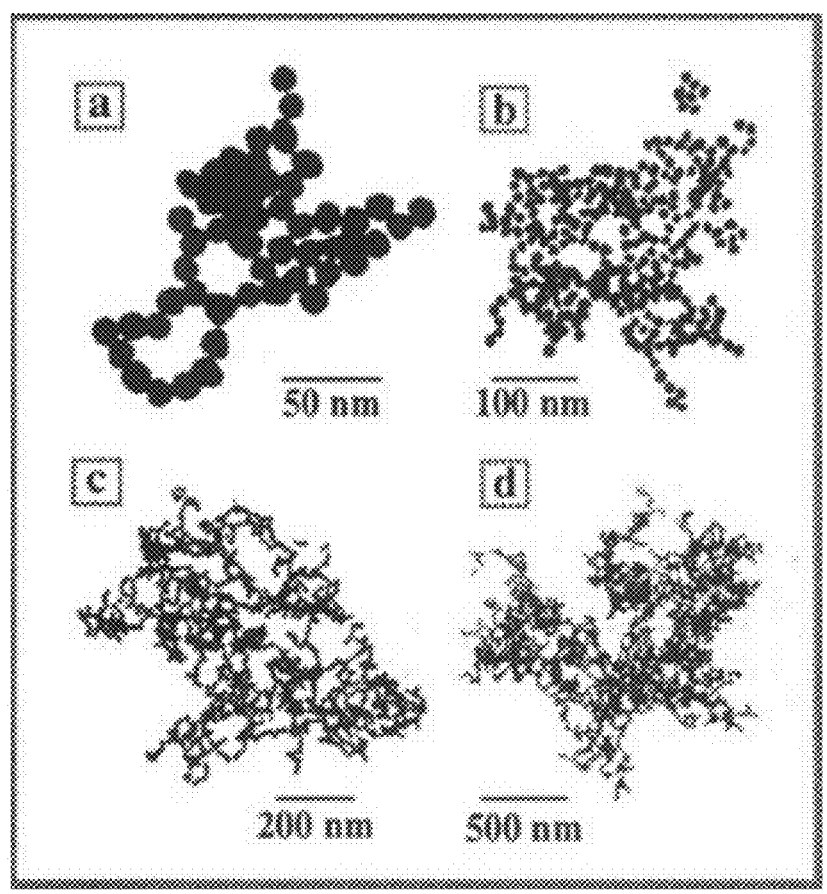
FIG. 11—graph diagram showing the particle clumping by particle size.

In accordance with FIG. 11, it appears that particles in the nanometer range have a strong tendency to clump, due to the Van der Waals interaction forces. The stability of the colloidal nano-dispersion of the present invention is possible because of the balance between the forces of attraction (FIG. 10 (a)) and repulsion (FIG. 10 (b)) under a defined pressure.

Not previously stable and with distinct phases and components, the nitrocellulose-acrylic system is transformed under specific pressure conditions applied during the process into a single-phase system in the form of colloid with a particle size defined as between approximately 100 nm to 200 nm, a uniform film that is easy to apply and is not altered by stressing actions or some other form of resistance due to its characteristics (greater resistance to temperature and pressure) heterogeneous and able to spreadability, forming a uniform film that is easy to apply and is not altered by stressing actions or some other form of resistance due to its characteristics (greater resistance to temperature and pressure).

The process according to this invention may be described through the steps polymerizing the nitrocellulose solution with the acrylic dispersion, adding ethoxylated ether-based surfactants at a system temperature ranging between 10° C. and 90° C., when the stability of the formed film is attained, with a positive pressure ranging from 50,000 kPa (500 bar) and 100,000 kPa (1000 bar).

Polymerization is fully associated with the nitrogen level in the nitrocellulose solution, where the low and medium nitration nitrocellulose offers greater efficiency and smaller particle size. Another factor influencing polymerization and application of the product resulting, froth this invention is the molecular weight of the nitrocellulose, which is directly proportional to the viscosity thereof. The viscosity of the nitrocellulose impacts the final resin and must be determined according to the final application of the film.

The process according to this invention comprises the following steps:
  a) dissolving the nitrocellulose in at least one acrylic monomer, with the choice of the monomers guided by the specific application of the obtained dispersion;
  b) adding at least one surfactant;
  c) adding polymerization initiators at an appropriate adding speed;
  d) stirring the reaction mixture at a suitable polymerization temperature and agitation speed;
  e) running the resulting colloidal dispersion through a high pressure homogenizer.

More preferably, the process according to this invention comprises the following steps:
  a) in a reactor, adding at least one monomer or mixture of monomers, a quantity ranging between 250 g and 2000 g;
  b) heating the at least one monomer or mixture of monomers to a temperature ranging between approximately 15° C. and BD° C. and add at least one surfactant in a quantity ranging between 0.5 g and 120 g;
  c) homogenizing the reaction mixture for a period ranging between approximately 5 and 60 minutes;
  d) adding the nitrocellulose solution in a quantity ranging between 50 g and 1500 g, to a temperature ranging between approximately 15° C. and 60° C. and stir steadily at a speed ranging between approximately 100 rpm to 5000 rpm;
  e) lowering the reaction temperature to arrange between approximately 10° C. and 25° C., and slowly add an amount of deionized water that varies between 200 g and 3500 g, stirring at approximately 200 rpm to 4000 rpm, for a period of time ranging between approximately 5 and 60 minutes;

f) cooling the pre-emulsion obtained in step (e) to a temperature ranging from approximately 15° C. and 30° C. and transfer the pre-emulsion to a high-pressure homogenizer machine;

g) activating the continuous flow system and adjust the pressure regulating valves to a pressure ranging from approximately 50,000 kPa (500 bar) to 100,000 kPa (1000 bar);

h) after completing step (g), regulating the equipment to a pressure ranging from 80,000 kPa (800 bar) to 100,000 kPa (1000 bar) for performing new cycle;

i) starting a new cycle by repeating step (h), but subjecting the dispersion to a pressure of 100,000 kPa (1000 bar);

j) repeating step (i) twice for complete homogenization of the dispersion particle sizes;

k) transferring the colloidal nano-obtained dispersion in step (j) into a jacketed reaction vessel heated to a temperature between approximately 35° C. to 90° C. under laminar stirring at between approximately 200 rpm and 4500 rpm;

l) dripping a solution containing between 10 g and 400 g of water and 0.5 g and 40 g of at least one polymerization initiator on to the obtained dispersion in a homogenous manner for a period ranging from approximately 1 hour to 5 hours;

m) adding a redox couple;

n) adding between 0.1 g and 2.5 g of at least one polymerization initiator in between 5 g and 100 g of water and repeat this step through to the complete polymerization of at least one monomer or mixture of monomers;

o) keeping the reaction vessel at a temperature ranging from approximately 40° C. to 95° C. for a time of approximately 10 minutes to 60 minutes;

p) cooling the reaction vessel to approximately 30° C. neutralizing the obtained dispersion with an ammonium hydroxide 17% to between approximately pH 7.0 to pH 9.5.

The acrylic dispersion is formed by at least one acrylic monomer or a mixture thereof, selected from the group consisting of: acrylic acid, methacrylic acid, methyl acrylate, ethyl acrylate, n-propyl acrylate, butyl acrylate, isobutyl acrylate, 2-ethyl hexyl acrylate, n-pentyl acrylate, hexyl acrylate, heptyl acrylate, iso heptyl acrylate, hydroxyethyl acrylate, hydroxypropryl acrylate, hydroxybutyl acrylate, methyl methacrylate, ethyl methacrylate, propryl methacrylate, butyl methacrylate, isobutyl methacrylate, pentyl methacrylate, hydroxyethyl acrylate, hydroxypropryl acrylate, isodecyl methacrylate, lauryl methacrylate, tri-decyl methacrylate, glycidyl methacrylate, styrene, vinyl acetate, acrylamide, bis-acrylamide, n-methylol acrylamide.

The emulsion may or may not contain functional monomers of the following types: 3-(acryloyloxy)-2-hydroxypropyl methacrylate, bis [2-(methacryloyloxy) ethyl] phosphate, 1,3-butanediol diacrylate, glycerol 1,3-diacrylate diglycerolate, 1,6-hexanediol diacrylate, neopentyl glycol diacrylate, dimethyl aminoethyl methacrylate, aminoethyl methacrylate t-butyl, 1,3-butylene glycol dimethacrylate, 2-(4-benzoyl-3-hydroxyphenoxy) ethyl acrylate, 2-hydroxy phenoxypropyl-3-acrylate, trimethylol propane triacrylate, among others.

The nitrocellulose solution is defined from the group consisting of low nitration nitrocellulose (between 10.4% and 11.8% nitrogen), the so-called alcohol-soluble (AS) nitrocelluloses and high nitration nitrocellulose (between 11.8% and 12.5% nitrogen), the so-called ester-soluble (ES) nitrocelluloses. More specifically, the nitrocelluloses used in the present invention can be defined from the following classifications according to the DIN Standard adopted by the Brazilian Technical Standards Association (ABNT): 4E, 5E, 6E, 7E, 8E, 9E, 10E, 11E, 12E, 13E, 14E, 15E, 16E, 17E, 18E, 19E, 20E, 21E, 22E, 23E, 24E, 25E, 26E, 27E, 28E, 29E, 30E, 31E, 32E, 33E, 34E, 35E, 36E, 37E; and A8, A9, A10, A11, A12, A13, A14, A15, A16, A17, A18, A19, A20, A21, A22, A23, A24, A25, A26, A27, A28, A29, A30, A31 and A32.

The surfactant is defined by at least one surfactant or mixture of surfactants selected from the group consisting of nonionic, anionic, cationic and amphoteric surfactants, for example, sulfonated fatty acids, sulfonated polyesters, sulfonated naphthalenes, complex phosphate esters ethoxylated or not, ethoxylated carboxylic esters or not, nonyl and octyl phenol ethoxylate esters, ethoxylated alcohol esters or derivatives, aliphatic or aromatic quaternary ammonium salts, aliphatic or cyclic ethoxylated olefins and phospholipids, among others. More preferably, the surfactant is polyoxyethylene tridecyl ether phosphate.

The polymerization initiators that act as free radical generators or a redox couple, soluble or not in water or the oil phase are defined from the group comprising: sodium, potassium and ammonium persulfate, hydrogen peroxide, iron salts, sodium sulphite, sodium and potassium thiosulphate, sodium and potassium metabisulfite, sodium and zinc formaldehyde sulfoxylate, azo type compounds (azo-bis-iso-butyronitrile and others), organic hydroperoxides and peroxides that may or may not be used together with the water-soluble reducing agents. More preferably, the polymerization initiators include: ammonium persulfate, tert-butyl hydroperoxide and sodium bisulfite.

The colloidal nano-dispersion obtained by the process described above has a particle size ranging from approximately 100 nm to 200 nm, more preferably between azo nm and 140 nm.

EXAMPLES

The following examples will better illustrate the present invention and the particular conditions and parameters described represent preferred embodiments, but do not limit the present invention.

Example 1: Process for Obtaining the Colloidal Nitrocellulose Nano-Dispersion

Example 1 (A)

The monomers are loaded into a jacketed reactor in the following proportions: 456 g of butyl acrylate (BA), 226 g of ethyl acrylate (EA), 180 g of methyl methacrylate (MMA), 260 g of styrene, 60 g of methacrylic acid (MA) and 80 g of acrylamide (45% solids). The mixture of monomers is then heated to a temperature of 60° C. and 45 g of polyoxyethylene tridecyl ether phosphate surfactant is added (Rhodafac RS610, manufactured by Rhodia), 12 g of alkylaryl polyglycol ether sulfate surfactant (25 Hostapal BVQ, manufactured by Clariant), 6 g of polyethylene glycol alkyl ether sulfate surfactant, with 7 mols of ethylene oxide (Emulsogen EPA073, manufactured by Clariant). Homogenization is maintained for 10 minutes, then slowly adding 850 g of type A34 nitrocellulose (25AS) moistened in water (with 70% solids). The system is stirred constantly using a Cowless-type mixer for 30 minutes at a speed of 4000 rpm and a temperature of 40° C. After this period, the temperature is lowered to 25° C., then slowly adding 1500 g of deionized water while stirring at 2800 rpm for 30 minutes. The pre-emulsion obtained by this step is cooled to a temperature of 20° C. and transferred to a high pressure homogenizing device (HOMOGENIUS). The continuous flow system is switched on and the pressure regulating valves are adjusted to reach a pressure of 50,000 kPa (500 bar). After all pre-emulsion is subjected to this pressure, the equipment is set to 80,000 kPa (800 bar) and a new cycle is performed. The step is repeated by subjecting the dispersion to a 100,000 kPa (1,000 bar) pressure, and this cycle is repeated twice at this pressure.

The colloidal nano-dispersion is transferred to a jacketed reaction vessel heated to 85° C. with laminar stirring at 500 rpm. A solution containing 256 g of water and 16 g of ammonium persulfate is dripped steadily for three hours into the dispersion prepared as described above. The redox couple is then added for the polymerization of the residual monomers. Next, 1.1 g of tert-butyl hydroperoxide is added, diluted in 50 g of water, together with 1.3 g of sodium metabisulfite dissolved in 50 g of water. The reaction vessel is kept at a temperature of 85° C. for one hour. It is then cooled to 30° C. and neutralized to pH 8.5 with a 17% ammonium hydroxide solution.

Example 1 (B)

The monomers are loaded into a jacketed reactor in the following proportions: 680 g de ethyl acrylate (EA). The mixture of monomers is subsequently heated to a temperature of 40° C., then adding 15 g of polyoxyethylene tridecyl ether phosphate surfactant (Rhodafac RS610, manufactured by Rhodia), 2 g dand polyethylene glycol alkyl ether sulfate surfactant, with 7 mols of ethylene oxide (Emulsogen EPA073, manufactured by Clariant). Homogenization is maintained for 10 minutes, then slowly adding 420 g of type E27 nitrocellulose (¼ ES) moistened in water (with 70% solids). The system is stirred constantly using a Cowless-type mixer for 25 minutes at a speed of 4500 rpm and a temperature of 50° C. After this period, the temperature is lowered to 25° C., then slowly adding 550 g of deionized water while stirring at 1500 rpm for 20 minutes. The pre-emulsion obtained by this step is cooled to a temperature of 25° C. and transferred to a high pressure homogenizing device (HOMOGENIUS). The continuous flow system is switched on and the pressure regulating valves are adjusted every 25 minutes in order to gradually reach pressures of 50,000 kPa (500 bar), 80,000 kPa (800 bar) and 100,000 kPa (1000 bar). After all the dispersion is subjected to a pressure of 100,000 kPa (1000 bar), the reflux is maintained for 30 minutes. The colloidal nano-dispersion is transferred to a jacketed reaction vessel heated to 85° C. with laminar stirring at 500 rpm. A solution containing 100 g of water and 5.1 g of potassium persulfate is dripped steadily for two hours into the dispersion prepared as described above. The redox couple is then added for the polymerization of the residual monomers. Next, 0.3 g of tert-butyl hydroperoxide is added, diluted in 20 g of water, together with 0.4 g of sodium metabisulfite dissolved in 20 g of water. The reaction vessel is kept at a temperature of 75° C. for 30 minutes. It is then cooled to 30° C. and neutralized to pH 8.5 with a 17% ammonia hydroxide solution.

Example 2: Infrared (IR) Spectroscopy

Figure 12:
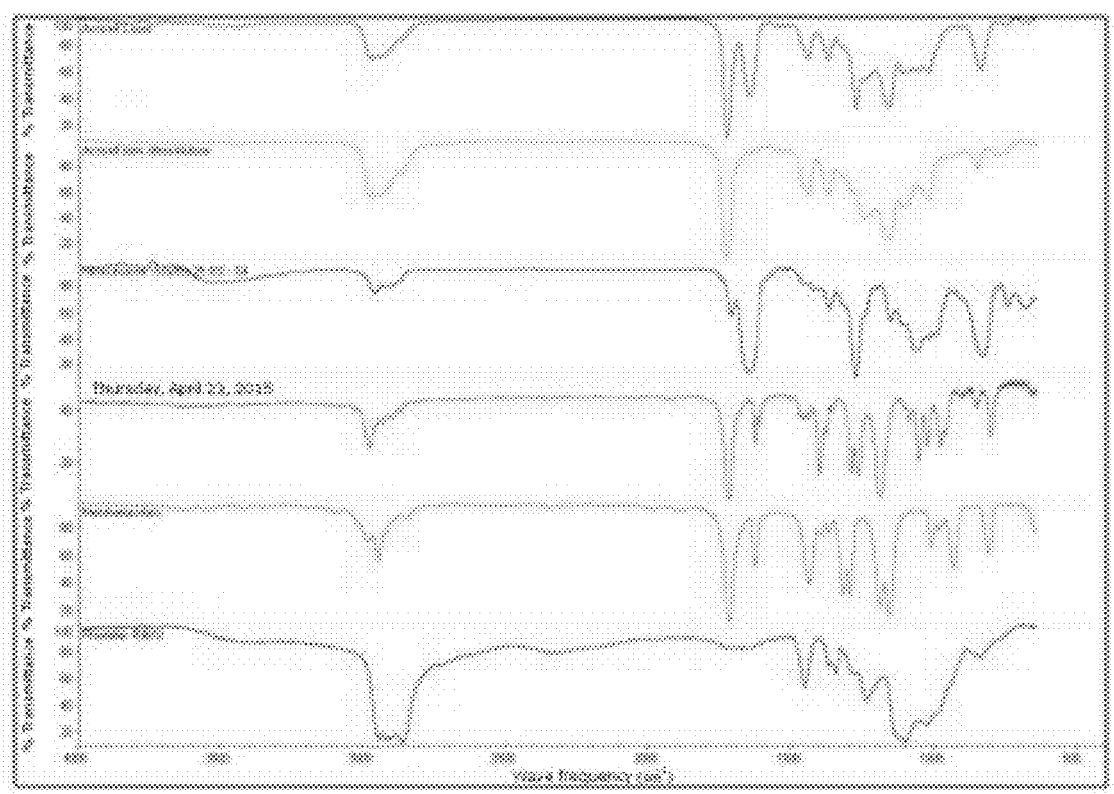
FIG. 12—presents the characterization of the colloidal emulsion in a water base by IR spectrum spectrophotometry, showing the Fourier Transform infrared (FT-IR) spectra of the main raw materials, polymerized resin with and without nitrocellulose) proving the efficiency of the polymerization process.

Infrared (IR) Spectroscopy is used to determine organic end groups through emitting a wave beam in a specific range. It was thus possible to ascertain the active presence of nitrate groups and nitrocellulose activity levels in the formation of the colloidal dispersion, as well as its full solubility with the acrylic groups, as shown in FIG. 12.

Figure 8:
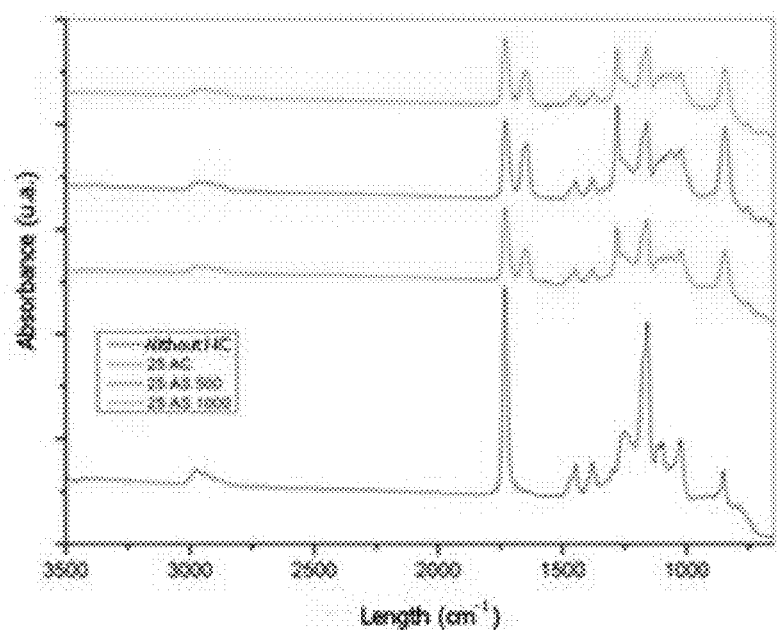
FIG. 8—presents a graph representation of absorbance of the samples—with and without nitrocellulose.

The data presented in the following absorbent table, and also in FIG. 8, show the different conditions without nitrocellulose and the different pressures with nitrocellulose. That spectrophotometric curve shows greater linearity in the structure with higher pressure, proving incorporation, stability and self-control, defining itself-organization in the proposed pressure range between 500,000 kPa (500 bar) and 100,000 kPa (1000 bar).

The Fourier Transform infrared (FT-IR) spectra of the resin sample used in this invention, show nitrate group absorptions characteristic of NC, as set forth in the following absorbence table:

| 1600-1650 cm$^{-1}$ | Asymmetric stretch of the NO$_3$ group | intense absorption |
|---|---|---|
| 1280 cm$^{-1}$ | Asymmetric stretch of the NO$_3$ group | intense absorption |
| 870 cm$^{-1}$ | Stretch of NO | weak absorption |

The same spectrum also shows the carbonyl group (C=0) absorption bands in 1720, present in acrylic resins (and also in acrylic monomers). The presence of absorption bands as discussed above, suggests the presence of nitrocellulose and acrylic resin in the product resulting from this invention.

Example 3: Structure Characterization and Polymer Structure Organization—Scanning Probe Microscopy Test The scanning probe microscopy test allows an assessment of the nitrocellulose block assembly and its colloidal condition in the formation of a homogeneous system, through pressure levels coordinated in accordance with this invention.

The scanning probe microscopy test was conducted at a temperature of 23° C. (+/−1), using the following equipment: AFM NX10 Park System and AFM Nanoscope IIIa Digital Instruments; the data treatment software was Gwyddion versão 2.38 FIGS. 1 to 6 present the results of the test conducted on three types of samples: sample without nitrocellulose, sample with alcohol-soluble nitrocellulose and sample with ester-soluble nitrocellulose. Samples were prepared on mica substrates with a maximum area of 10×10 mm, and the AFM was operated in intermittent contact mode, allowing the acquisition of topography and phase contrast images simull simultaneously.

Table 1 below presents the test results with information on particle distribution, diameter and zeta potential far the above-mentioned acrylic dispersion samples.

Assessing the results of the analyses presented in FIGS. 1 to 6, it is possible to prove the efficiency of the particle size reduction process down to the nano level, using the high-pressure homogenizer at a pressure of 100,000 kPa (1000 bar).

Phase Contrast images evaluate the visco-elasticity of the films proposed in this invention. Different color contrasts represent the different physical and chemical properties of the films produced.

Topography images provide information on the even smoothness of the film surface. When compared with a three-dimensional plane, the darker colors are the base sample images, while lighter colors are information from the top of irregularities in the film.

Figure 1:
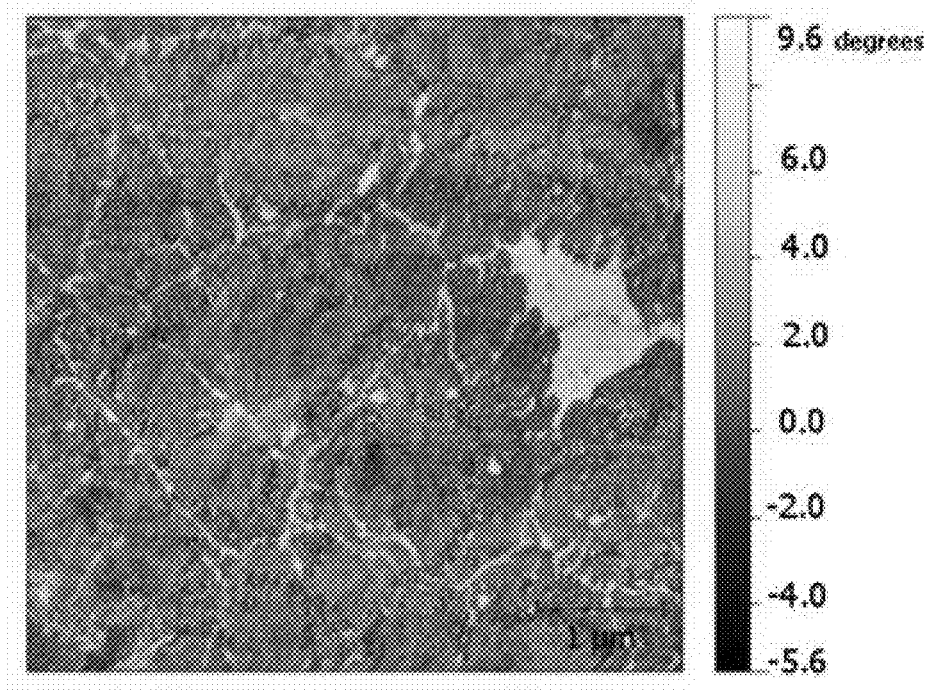
FIG. 1—presents the results of the test conducted through scanning probe microscopy on a sample without nitrocellulose.
Figure 4:
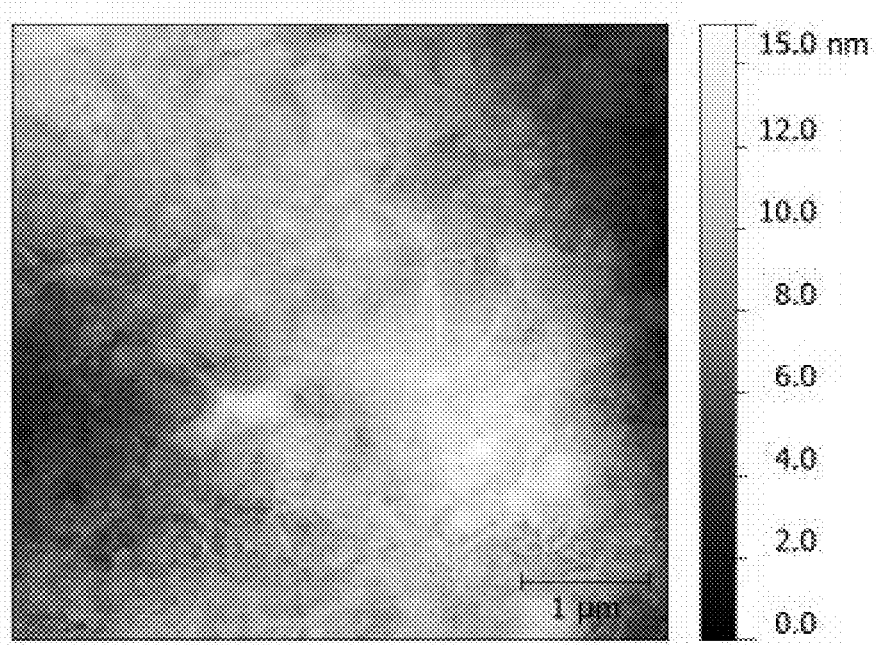
FIG. 4—presents images of acrylic resin topography, without nitrocellulose.

FIG. 1 shows a Phase Contrast image of the acrylic resin without nitrocellulose. The homogeneity is quite clear in the film, as a sample contains only one polymer. This information may also be confirmed in, FIG. 4 presenting Topography images of the acrylic resin without nitrocellulose.

Figure 2:
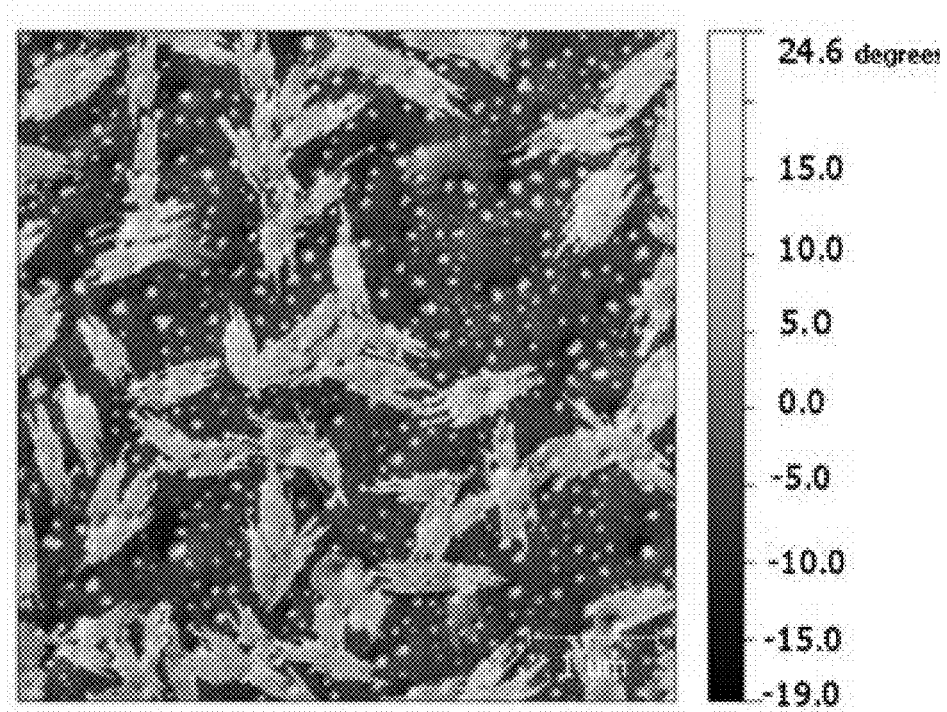
FIG. 2—presents phase contrast images of the aqueous dispersion phase containing nitrocellulose without running through the high pressure homogenizer.
Figure 5:
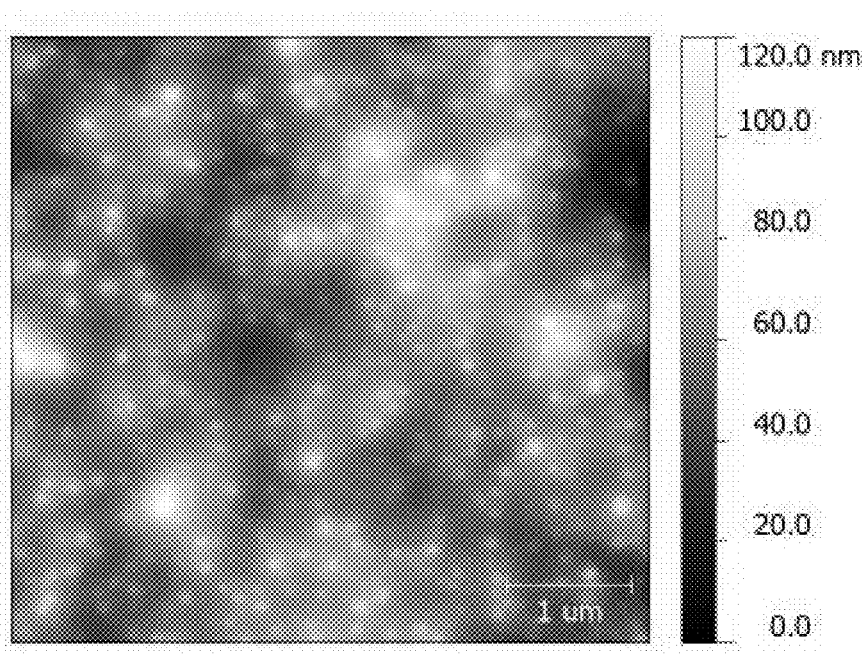
FIG. 5—presents images of the aqueous dispersion phase topography containing nitrocellulose without running through the high pressure homogenizer.

FIG. 2 presents Phase Contrast Images of the aqueous dispersion containing nitrocellulose without running through the high-pressure homogenizer, clearly showing the two-phase separation and thus proving that there are two different polymer compositions in the sample. Meanwhile, FIG. 5 presents a Topography image, proving irregularities in the smooth surface of the film, indicating the heterogeneity of the sample.

Figure 3:
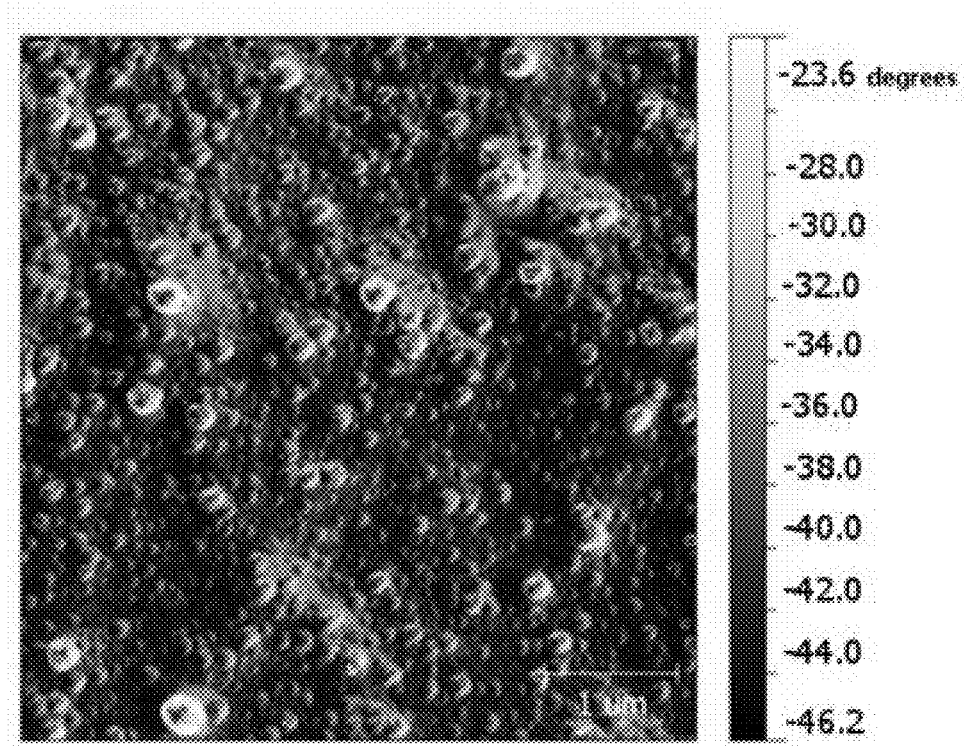
FIG. 3—presents phase contrast images of the aqueous dispersion phase containing nitrocellulose using a high pressure homogenizer.

FIG. 3 presents Phase Contrast images of the aqueous dispersion containing nitrocellulose, using the high-pressure homogenizer (100,000 kPa (1000 bar)) and indicating the full inter-phase homogeneity of the two polymers in the sample. The nanometric size of the particles is also shown in the spherical aspect of the images. This information may also be confirmed in FIG. 6, which presents Topography images clearly showing the evenness of the smooth surface of the sample.

Figure 6:
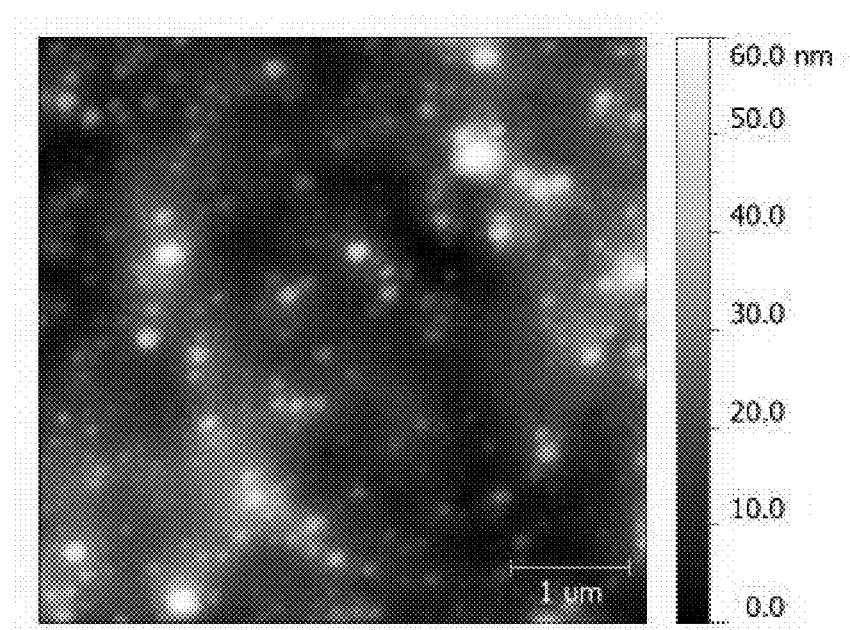
FIG. 6—presents images of the aqueous dispersion topography containing nitrocellulose using a high pressure homogenizer.

FIGS. 3 and 6 show the results for the aqueous dispersion containing nitrocellulose, using the high-pressure homogenizer (100,000 kPa (1000 bar)), proposed in this invention, with nano-particles that endow the formed film with high-performance properties; when reticulated, the polymers cling more closely to the substrate, thus minimizing week points in films with cracks.

Figure 7:
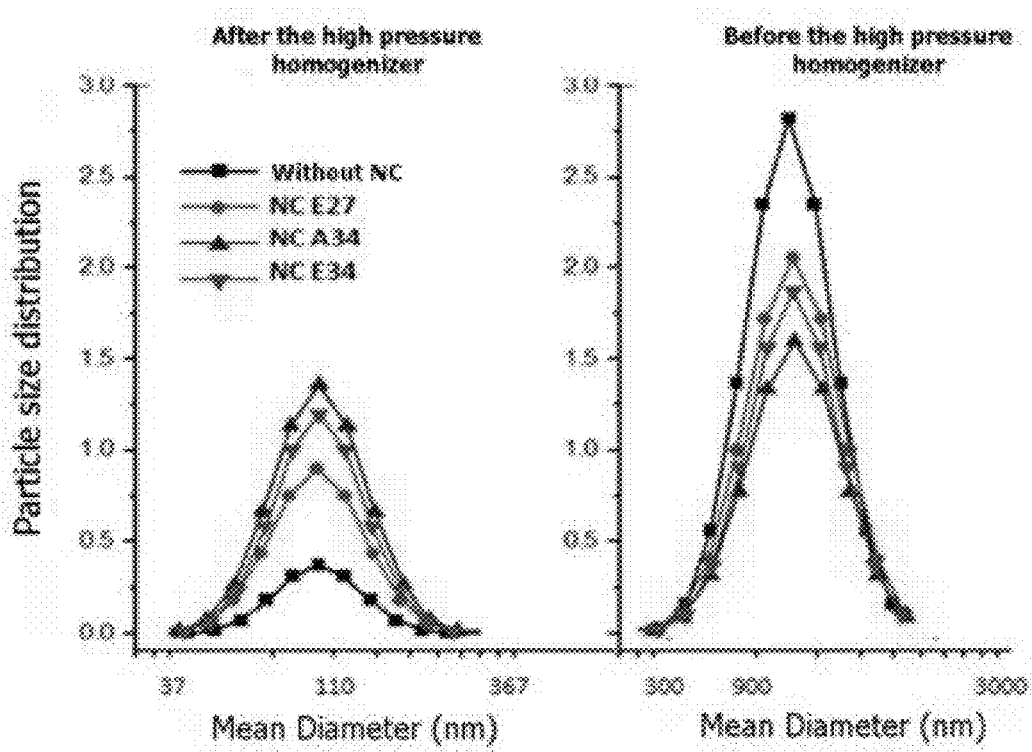
FIG. 7—presents a samples particle distribution graph with and without nitrocellulose by mean diameter for acrylic dispersion samples.

FIG. 7 shows the particle size distribution by mean diameter for the acrylic dispersion samples.

Example 4: Gel Permeation Chromatography

Figure 9:
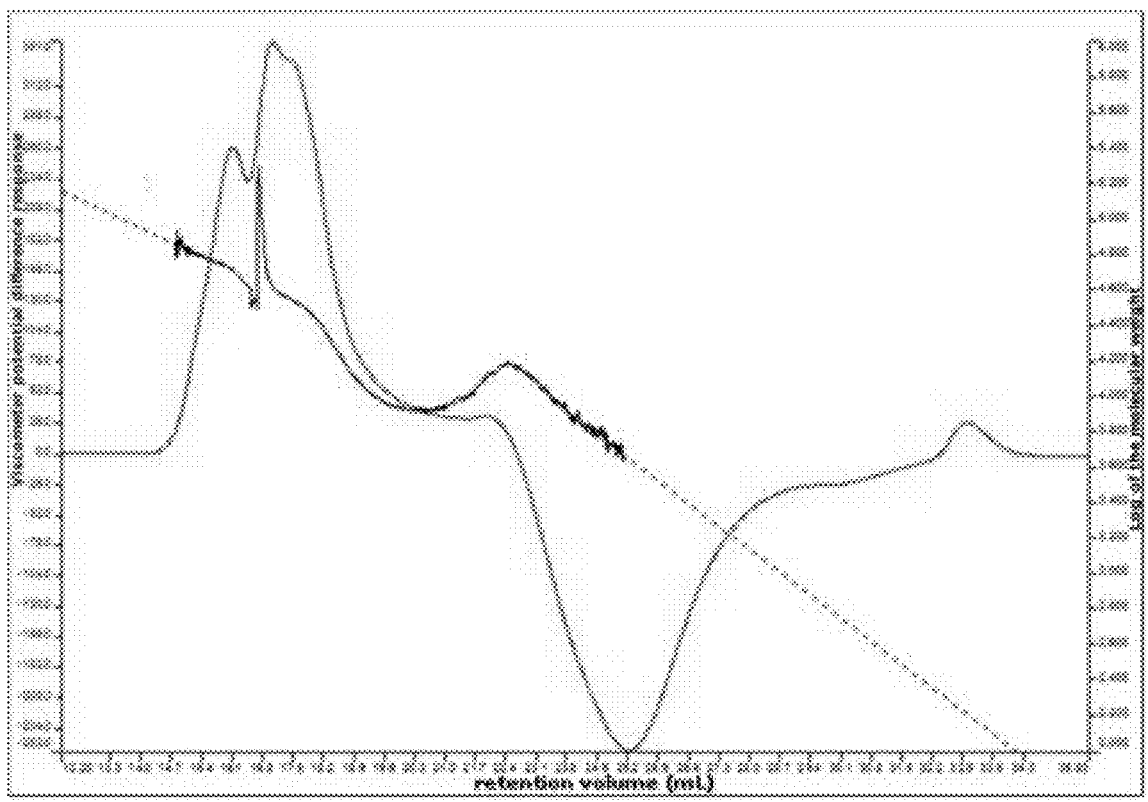
FIG. 9—presents a graph representation of the characterization through the gel permeation chromatography technique with component detection by different molecular weights.

The gel permeation chromatography technique allows component detection by specific molecular weights, such as the nitrocellulose solution and acrylic emulsion that are present in soluble in the colloid composition. Their peaks are distinct and present the ideal particle size for the most suitable solubility of the system, proving that self-organization occurs with particle size adjustment, associated with the action of pressure on the dispersion. FIG. 9 presents the characterization curve through gel permeation chromatography, whether highest peak represents the sample containing NC (high molecular weight polymer) while the lowest peak represents an acrylic resin (low molecular weight polymer).

Example 5: Methodology and Discussion of the Results

The polymerization process described in Example 1 above, using the micro-dispersion and pressure emulsification method proved efficient for reducing particle size, conferring properties not heretofore obtained.
Particle Size, Polydispersity and Viscosity A reduction of more than 240% in colloidal dispersion particle size, when subjected to the high-pressure emulsification process by a high-pressure homogenizer under a pressure of 100,000 kPa (1000 bar).

The process consists of forcing the continuous flow of the colloidal pre-dispersion fluid through a homogenization valve with the aid of a positive displacement pump. The narrow orifice size will be inversely proportional to the required pressure. At a very high pressure, liquid flaws at a very high speed (up to 200-300 m/s) through the homogenization valve. As this orifice is quite narrow, measuring only a few micro-meters, fluid dynamics in this region are quite critical and also very complex. After running through the narrow orifice, the liquid speeds up, with a resulting high shear stress and sudden pressure drop leading to the disruption of the micelles, thus producing a colloidal dispersion with new nano-micelles when subjected to a pressure of 100,000 kPa (1000 bar). The suspension is kinetic less stable. Reducing particle size to nano levels controls gravity separation by minimizing density difference and rheological stability The results of poly-dispersivity show greater particle size uniformity, i.e., the process described herein produces more homogeneous particles in a narrower range than the micelle sizes.

Through observing the obtained viscosities, the efficiency of particle size reduction can be confirmed. Smaller particle sizes produce dispersions with higher viscosities. Data on particle size, polydispersity and viscosity are presented in Table 1 below.
Electrostatic Forces Between the Micelles The zeta potential is a physical and chemical measurement that provides information on the repulsive electrostatic forces of the coloidal dispersion.

The results presented in Table 1 below as the zeta potential values indicate that the presence of nitrocellulose in the colloidal dispersion fosters the electrokinetics of the medium, lowering these values by 2.3 times, compared to dispersions without nitrocellulose that are also subjected to nitrocellulose a pressure of 100,000 kPa (1000 bar). These results are of great importance for steering new nitrocellulose applications in different segments, underpinning the stability of their formulations while keeping an even balance between the forces of attraction (Van der Waals) and repulsion (electrostatic) among the micelles in the emulsion.
Determination of Water Absorption The obtained resin was homogenized and a fraction was transferred to a glass plate measuring 30×30 cm, with the aid of a 100 pm one-piece rod extender, thus obtaining a homogeneous film. The film was dried at room temperature and left at rest for seven days for complete the reticulation of the resin.

The glass plate containing the dried film was then weighed on an analytical scale and subsequently immersed in a vat of distilled water, kept there for twelve hours at 25° C. Subsequently, the plate was dried and weighed again, in order to evaluate how much water had been absorbed. The result is shown in Table 1 below, expressed as a percentage.
Determination of Hardness The obtained resin was homogenized and a fraction was transferred to a glass plate measuring 30×30 cm, with the aid of a 100 pm one-piece rod extender, in order to obtain a homogeneous film. The film was dried at room temperature and kept at rest for seven days for complete reticulation of the resin.

The hardness of the films was then measured by applying a standard-weight backing with a pencil whose lead consisted of graphite with known hardness. The graphite scale are plotted for assessing the risk resistance of the film, according to the ANT MBR 14535 Standard (Hardness Scale;
6B<5B<4B<3B<2B<B<HB<F<H<2H<3H<4H<5H<6H<7H). The results are shown in Table 1 below.
Determination of Gloss The obtained resin was homogenized and a fraction was transferred to LENETA® card stock with the aid of a 100 pm one-piece rod extender, thus obtaining a homogenous film.

The film was dried at room temperature and left at rest for seven days for complete reticulation of the resin.

The gloss of the formed films was then measured, using an IKA Glossmeter model 432 device that uses standard incident light at an angle of 60°. The results are set forth in Table 1 below.

Determination of Adherence

The obtained resin was homogenized and a fraction was transferred to a glass plate measuring 30×30 cm, with the aid of a 100 pm one-piece rod extender, thus obtaining a homogenous film. The film was dried at room temperature and left at rest for seven days for complete reticulation of the resin. A tack test was then conducted, using a standard gripper with parallel blades set 2 mm apart. Grid-shaped cuts were then made down to the substrate base, forming a grid. A standardized adhesive tape was applied and then removed in a uniform manner, in accordance with the ASTM D 3359 Standard. The amount of film peeling away from the substrate was then assessed (Adherence Scale: 0-1-2-3-4, where 0=excellent and 4=very poor). The results are set forth in Table 1 below.

Determination of Dry and Wet Coverage

An ink was formulated, with dioxide as a pigment and the resin produced through the process addressed by this invention, as the film-forming resin. The obtained ink was homogenized and a fraction was transferred to LENETA® card stock with the aid of a 100 pm one-piece rod extender, thus obtaining a homogenous film. The film was dried at room temperature and left at rest for seven days for complete reticulation of the resin. A visual comparison analyzed which had the best coverage, using the criterion of which layer performed best for covering the black strip on the LENETA® card stock substrate. For comparative purposes, Acronal 295D resin was used. The data are presented in Table 1 below.

Determination of Drying Time

The resin was homogenized and a fraction was transferred to a glass plate measuring 30×30 cm, with the aid of a 100 pm one-piece rod extender, thus obtaining a homogenous film. Using a chronometer, the length of time required for the entire liquid phase of the resin to evaporate was measured, until the film was no longer tacky. The data are presented in Table 1 below.

Heat Resistance

The resin was homogenized and a fraction was transferred to a rawhide blanket measuring 40×40, using a spray gun, applying to coats in crosswise directions, in order to fill all the pores of the substrate. The film was dried at room temperature and left at rest for seven days for complete reticulation of the resin. The leather with the reticulated film was placed in an embossing press at a temperature of 160° C. and a pressure of 18,000 kPa (180 bar) for 15 seconds. This experiment assessed embossing quality and film resistance to temperature and pressure.

The results of this experiment (vide Table 1) show that coloidal dispersion containing nitrocellulose provides better resistance to heat and pressure, compared to a system without nitrocellulose. This may be attributed to the molecular structure of the nitrocellulose, which is a high molecular weight polymer with a linear structure. E these results indicate a new application for nitrocellulose in leather coating systems, with formulations that have no volatile organic compounds (VOC free).

Drying Time, Adherence, Hardness, Coverage, Water Absorption and Gloss

The polymerization process using the micro-dispersion and high-pressure homogenizer emulsification method at a pressure of 100,000 kPa (1000 bar) results in a coloidal nano-dispersion that endows the applied films with high-performance properties. As described in Table 1 below, the results indicate quick-drying finishes with good adherence, good hardness, excellent dry and wet coverage, low water absorption and high gloss. These properties were obtained through the nanometric size of the particles. Micelles with nano-particles formed films with smaller voids or gaps between the reticulated polymer structures. Smaller micelles mean narrower spaces between the polymers and better performances, including better adherence to substrates greater gloss through reflecting more incident light.

TABLE 1

| Characterization | Acrylic Emulsion without NC | Acrylic emulsion with NC AS no pressure | Acrylic Emulsion with NC AS (50,000 kPa - 500 bar) | Acrylic Emulsion with NC AS (80,000 kPa - 800 bar) | Acrylic Emulsion with NC AS (100,000 kPa - 1000 bar) |
|---|---|---|---|---|---|
| Viscosity (cP) | 6.2 | 7.8 | 8.7 | 11.4 | 14.6 |
| pH | 7.5 | 7.4 | 7.5 | 7.5 | 7.4 |
| Solids (%) | 45.1 | 45.3 | 45.2 | 45.3 | 45.2 |
| Mean Diameter | 274.2 | 270.1 | 201.1 | 147.5 | 113.9 |
| Polydispersitivty | 0.678 | 0.782 | 0.482 | 0.312 | 0.161 |
| Zeta Potential (mV) | −60.8 ± 1.9 | −113.9 ± 1.3 | −118.5 ± 1.2 | −126.1 ± 1.1 | −137.2 ± 1.4 |
| Drying time (min.) | 105 | 44 | 37 | 31 | 25 |
| Adherence (grau) | gr 3 | gr 3 | gr 2 | gr 1 | gr 0 |
| Hardness (lápia) | 3B | HB | H | 3H | 5H |
| Gloss(ub) | 56 | 72 | 77 | 81 | 89 |
| Water Absorption (%) | 12.4 | 13.7 | 5.1 | 4.8 | 3.2 |
| Wet Coverage | =Standard | =Standard | =Standard | =Standard | =Standard |
| Dry Coverage | =Standard | =Standard | =Standard | =Standard | =Standard |

Through self-organization when exposed to homogenization conditions under pressure, the subject of this invention—a colloidal nano-dispersion of a nitrocellulose system solubilised in acrylic monomers—maybe characterized by its particle size, its efficiency on an acrylic dispersion and its complete organization within the proposed pressure range.

The use of pressure during the particle size reduction process results in a, genius system for acrylic co-polymer and nitrocellulose particle sizes. This consequently endows films with greater chemical and mechanical resistance, high gloss, excellent finishes due to easy resin shaping to the substrate, enhanced coverage for pigmented formulations, greater rheological power of the formulations, and better adherence to substrates. One particularly, it provides excellent wood pore filling through wood varnish and sealant compositions, offering high quality finishes in inks, paints, varnishes and sealants for coatings in the printing segments, such as flexography, rotogravure and lamination providing excellent adherence to segment substrates, with notable pigment dispersion in the formulation composition, high gloss and shorter drying times. It also provides greater stability for paint and ink formulations, extending the shelf life of end-products.

Moreover, as this colloidal nano-dispersion is produced without organic solvents, being water-based, and with plant-based nitrocellulose that is biodegradable, its end-products—inks, paints, varnishes and other coatings—are environmentally friendly, drawn from renewable resources.

The invention claimed is:

1. Process for obtaining a colloidal dispersion characterized in that the said process comprises the steps of:
    a) dissolving nitrocellulose in at least one acrylic monomer, with the choice of the monomers guided by the specific application of the obtained dispersion;
    b) adding at least one surfactant;
    c) adding polymerization initiators at an appropriate adding speed;
    d) stirring the reaction mixture at suitable polymerization temperature and speed; and
    e) running the resulting colloidal dispersion through a high pressure homogenizer.

2. Process according to claim 1, characterized in that it comprises the following steps:
    a) in a reactor, adding at least one monomer or mixture of monomers in an amount ranging between 250 and 2000 g;
    b) heating the mixture of monomers at a temperature ranging from approximately 15° C. to 80° C. and adding at least one surfactant in an amount ranging between 0.5 g and 120 g;
    c) homogenizing the reaction mixture for a period ranging from approximately 5 to 60 minutes;
    d) adding the nitrocellulose solution in an amount ranging between 50 g and 1,500 g at a temperature ranging from approximately 15° C. and 60° C. and keep stirring at a rate ranging from approximately 100 rpm to 5000 rpm; and
    e) reducing the reaction temperature to a range between approximately 10° C. and 25° C. and slowly add a quantity of deionized water ranging from 200 g and 3500 g, under stirring of approximately 200 rpm to 4000 rpm for a period of time ranging from approximately 5 to 60 minutes so as to obtain a pre-emulsion.
    f) cooling the pre-emulsion obtained in step (e) to a temperature ranging from approximately 15° C. to 30° C. and transfering the pre-emulsion to a high-pressure homogenizer equipment;
    g) activating the continuous flow system and adjusting the pressure regulating valves to a pressure ranging from approximately 50,000 kPa (500 bar) to 100,000 kPa (1000 bar);
    h) adjusting the equipment to a pressure ranging from 80,000 kPa (800 bar) and 100,000 kPa (1000 bar) for performing new cycle;
    i) starting a new cycle by repeating step (h), subjecting the dispersion to a pressure of 100,000 kPa (1000 bar);
    j) repeating step (i) twice so as to obtain a colloidal nano-obtained dispersion;
    k) transfering the colloidal nano-obtained dispersion in step (j) into a jacketed reaction vessel heated to a temperature between approximately 35° C. to 90° C. under laminar stirring at between approximately 200 rpm and 4500 rpm;
    l) dripping a solution containing between 10 g and 400 g of water and 0.5 g and 40 g of at least one polymerization initiator on to the obtained dispersion in a homogenous manner for a period ranging from approximately 1 hour to 5 hours;
    m) adding a redox couple;
    n) adding between 0.1 g and 2.5 g of at least one polymerization initiator in between 5 g and 100 g of water and repeating this step until the complete polymerization of at least one monomer or mixture of monomers;
    o) maintaining the reaction vessel at a temperature ranging from approximately 40° C. and 95° C. for a period of approximately 10 minutes to 60 minutes;
    p) cooling the reaction vessel to approximately 30° C. and neutralizing the obtained dispersion with 17% ammonium hydroxide at between approximately pH 7.0 to pH 9.5.

3. Process according to claim 1, characterized in that the monomers or mixtures thereof are selected from the group consisting of: acrylic acid, methacrylic acid, methyl acrylate, ethyl acrylate, n-propyl acrylate, butyl acrylate, isobutyl acrylate, 2-ethyl hexyl acrylate, n-pentyl acrylate, hexyl acrylate, heptyl acrylate, iso heptyl acrylate, hydroxyethyl acrylate, hydroxypropryl acrylate, hydroxybutyl acrylate, methyl methacrylate, ethyl methacrylate, propyl methacrylate, butyl methacrylate, isobutyl methacrylate, pentyl methacrylate, hydroxyethyl acrylate, hydroxypropyl acrylate, isodecyl methacrylate, lauryl methacrylate, tri-decyl methacrylate, glycidyl methacrylate, styrene, vinyl acetate, acrylamide, bis-acrylamide and n-methylol acrylamide.

4. Process according to claim 1, characterized in that the colloidal dispersion may contain functional monomers selected from the group consisting of: 3-(acryloyloxy)-2-hydroxypropyl methacrylate, bis [2-(methacryloyloxy)ethyl] phosphate 1,3-butanediol diacrylate, glycerol 1,3-diacrylate diglycerolate, 1,6-hexanediol diacrylate, neopentyl glycol diacrylate, dimethyl aminoethyl methacrylate, t-butyl aminoethyl methacrylate, 1,3-butylene glycol dimethacrylate, 2-(4-benzoyl-3-hydroxyphenoxy)ethyl acrylate, 2-hydroxy-3-phenoxypropyl acrylate and trimethylol propane triacrylate.

5. Process according to claim 1, characterized in that the nitrocellulose solution is prepared using nitrocellulose selected from the group consisting of: alcohol-soluble nitrocellulose and ester soluble nitrocellulose.

6. Process according to claim 1, characterized in that the nitrocellulose solution is selected from the following group in accordance with the DIN Standard adopted by the Brazilian Technical Standards Association (ABNT): 4E, 5E, 6E, 7E, 8E, 9E, 10E, 11E, 12E, 13E, 14E, 15E, 16E, 17E, 18E, 19E, 20E, 21E, 22E, 23E, 24E, 25E, 26E, 27E, 28E, 29E, 30E, 31E, 32E, 33E, 34E, 35E, 36E, 37E; and A8, A9, A10, A11, A12, A13, A14, A15, A16, A17, A18, A19, A20, A21, A22, A23, A24, A25, A26, A27, A28, A29, A30, A31 and A32.

7. Process according to claim 1, characterized in that the surfactant can be nonionic, anionic, cationic or amphoteric.

8. Process according to claim 7, characterized in that the surfactant is selected from the group consisting of: sulfonated fatty acids, sulfonated polyesters, sulfonated naphthalenes, ethoxylated complex phosphate esters or not, ethoxylated carboxylic esters or not, ethoxylated nonyl and octyl phenol esters, ethoxylated alcohol esters or derivatives, quaternary salts of aliphatic or aromatic ammonium, aliphatic or cyclic ethoxylated amines and phospholipids.

9. Process according to claim 1, characterized in that the polymerization initiator is selected from the group comprising: sodium, potassium and ammonium persulfate, hydrogen peroxide, iron salts, sodium sulfite, sodium and potassium thiosulphate, sodium and potassium metabisulfite and sodium and zinc formaldehyde sulfoxylate; azo compounds (azo-bis-iso-butyronitrile and others), organic peroxides and hydroperoxides.

10. Process according to claim 1, characterized in that the polymerization initiator is ammonium persulfate, tert-butyl hydroperoxide or sodium bisulfite.

11. Process according to claim 1, characterized in that said process comprises the steps of:
   a) in a reactor, add 450 g of butyl acrylate, 220 g ethyl acrylate, 180 g of methyl methacrylate, 260 g of styrene, 60 g methacrylic acid and 80 g of acrylamide;
   b) heating the mixture of monomers at a temperature of 60° C. and 45 g of surfactant polyoxyethylene tridecyl ether phosphate, 12 g of surfactant alkyl aryl sulfated polyglycol ether, 6 g of surfactant alkyl ether of sulfated polyethylene glycol with 7 moles of ethylene oxide;
   c) homogenizing the reaction mixture for 10 minutes;
   d) slowly adding 850 g of the nitrocellulose AS, at a temperature of 40° C. and keep stirring at a speed of 4,000 rpm;
   e) reducing the reaction temperature to 25° C. and slowly adding a quantity of 1,500 g deionized water and under stirring of 2,800 rpm, for a period of time of 30 minutes, so as to obtain a pre-emulsion;
   f) cooling the pre-emulsion obtained in step (e) to a temperature of 20° C. and transfering the pre-emulsion to a high-pressure homogenizer equipment;
   g) activating the continuous flow system and adjusting the pressure regulating valves to a pressure of 50,000 kPa (500 bar);
   h) adjusting the equipment to a pressure of 80,000 kPa (800 bar) for performing new cycle;
   i) starting a new cycle by repeating step (h) subjecting the dispersion to a pressure of 100,000 kPa (1000 bar);
   j) repeating step (i) twice so as to obtain a colloidal nano-obtained dispersion;
   k) transfering the colloidal nano-obtained dispersion in step (j) into a jacketed reaction vessel heated to a temperature of 85° C. under laminar stirring of 500 rpm;
   l) dripping a solution containing 250 g of water and 16 g of ammonium persulfate on the obtained dispersion in a homogenous manner for a period ranging from 3 hours;
   m) adding a redox couple;
   n) adding 1.1 g of tert-butyl hydroperoxide in 50 g water, together with 1.3 g of sodium metabisulfite dissolved in 50 g of water;
   o) maintaining the reaction vessel at a temperature of 85° C. for a period of 60 minutes;
   p) cooling the reaction vessel to 30° C. and neutralizing the obtained dispersion with 17% ammonium hydroxide to a pH of 8.5.

12. Colloidal dispersion characterized by being obtained by the process as defined in claim 1.

13. Colloidal dispersion according to claim 12, characterized in that it is a nanometric dispersion.

14. Colloidal dispersion according to claim 12, characterized in that the dispersion particles have sizes between approximately 100 nm and 200 nm.

15. Colloidal dispersion according to claim 12, characterized in that the dispersion particles have sizes between 120 nm and 140 nm.

16. Colloidal dispersion according to claim 12, characterized in that it presents polydispersity from 0.16 to 0.48%.

17. Colloidal dispersion according to claim 12, characterized in that it is free of VOC (volatile organic content).

* * * * *